(12) United States Patent
Hsu et al.

(10) Patent No.: US 11,373,622 B2
(45) Date of Patent: Jun. 28, 2022

(54) DYNAMIC DISPLAY SWITCHING

(71) Applicant: NVIDIA CORPORATION, Santa Clara, CA (US)

(72) Inventors: ChinFeng Hsu, San Jose, CA (US); Andrew R. Bell, San Francisco, CA (US); Gabriele Gorla, Santa Clara, CA (US); Subhash Gutti, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 88 days.

(21) Appl. No.: 16/430,325

(22) Filed: Jun. 3, 2019

(65) Prior Publication Data
US 2019/0392781 A1 Dec. 26, 2019

Related U.S. Application Data

(60) Provisional application No. 62/690,300, filed on Jun. 26, 2018.

(51) Int. Cl.
G09G 5/12 (2006.01)
G09G 5/00 (2006.01)
G09G 5/36 (2006.01)
H04N 21/2368 (2011.01)

(52) U.S. Cl.
CPC ............ *G09G 5/12* (2013.01); *G09G 5/006* (2013.01); *G09G 5/363* (2013.01); *H04N 21/2368* (2013.01); *G09G 2310/0245* (2013.01); *G09G 2310/08* (2013.01); *G09G 2320/0266* (2013.01); *G09G 2352/00* (2013.01); *G09G 2360/06* (2013.01); *G09G 2360/10* (2013.01);
(Continued)

(58) Field of Classification Search
CPC ......... G09G 5/006; G09G 5/12; G09G 5/363; G09G 2310/0245; G09G 2310/08; G09G 2320/0266; G09G 2352/00; G09G 2360/06; G09G 2360/10; G09G 2360/18; G09G 2370/04; G09G 2370/20; G09G 3/36; H04N 21/2368; H04N 21/4143; H04N 21/42653
See application file for complete search history.

(56) References Cited

U.S. PATENT DOCUMENTS 9,165,537 B2 * 10/2015 Wyatt .................... G09G 5/395
2014/0198093 A1 * 7/2014 Nambi ................. G09G 3/3618
345/212
(Continued)

Primary Examiner — Stacy Khoo
(74) Attorney, Agent, or Firm — Artegis Law Group, LLP

(57) ABSTRACT

Various embodiments disclose a system that includes a first source processor that generates a first stream of graphics data, a second source processor that generates a second stream of graphics data, a display device that displays at least one of the first stream of graphics data and the second stream of graphics data, and a timing controller that is coupled to the first source processor and the second source processor and receives a first control signal to enter into a self-refresh state, in response, enters into the self-refresh state, causes the display device to display a first frame stored in memory, wherein the first frame includes at least a portion of data included in the first stream of graphics data, receives a second stream of graphics data, exits the self-refresh state, and causes the display device to display the second stream of graphics data.

18 Claims, 4 Drawing Sheets

(52) U.S. Cl.
CPC ..... *G09G 2360/18* (2013.01); *G09G 2370/04* (2013.01); *G09G 2370/20* (2013.01)

(56) References Cited

U.S. PATENT DOCUMENTS

| | | | |
|---|---|---|---|
| 2016/0109934 A1* | 4/2016 | Woo | G06F 1/3265 |
| | | | 345/211 |
| 2016/0117995 A1* | 4/2016 | Lee | G09G 3/20 |
| | | | 345/691 |
| 2018/0074777 A1* | 3/2018 | Emerson | G06F 3/1438 |
| 2018/0151153 A1* | 5/2018 | Heo | H04N 1/6016 |

* cited by examiner

DYNAMIC DISPLAY SWITCHING

CROSS-REFERENCE TO RELATED APPLICATIONS

This application claims priority benefit of the U.S. Provisional Patent Application titled, "FLAWLESS DYNAMIC DISPLAY SWITCH," filed on Jun. 26, 2018 and having Ser. No. 62/690,300. The subject matter of this related application is hereby incorporated herein by reference.

BACKGROUND

Field of the Various Embodiments

The present disclosure relates generally to displaying graphics data and, more specifically, to dynamic display switching.

Description of the Related Art

Many electronic devices, such as personal computers, laptops, and mobile devices, etc., include multiple processors, such as a central processing unit (CPU) and a graphics processing unit (GPU) that act as separate sources of the graphics data that is ultimately displayed on the displays of those electronic devices. Each of these sources separately delivers graphics data to the display hardware within the relevant electronic device, and the electronic device is generally responsible for selecting a particular source from which to obtain the graphics data for display.

Notably, each of the CPU and GPU has different capabilities and attributes, such as differing rendering and display scanout capabilities, which make one of these sources preferable for generating and delivering graphics data for display, depending on which application is running on the electronic device. For example, a better overall user experience may be provided when the GPU (e.g., a discrete GPU) is selected to generate and deliver the graphics data when a gaming application that requires more complex and/or voluminous graphics processing capabilities is running on the electronic device. By contrast, having the CPU (e.g., a CPU with an integrated GPU) generate and deliver graphics data may be more efficient when an application that does not produce large amounts of graphical content, such as a word processing application, is running on the electronic device. Accordingly, the display hardware oftentimes switches between sources based on the particular application that is executing on the electronic device.

One drawback of switching between processors to use as the source of the graphics data that is to be displayed is that the electronic device oftentimes causes the display to show glitches while the switch is being executed. Similarly, switching between processors can cause the display to flicker. Further, in instances where a discrete GPU is selected for rendering, in order to display rendered from the discrete GPU, the computing system must copy over rendered data for each frame. Copying the rendered data for each frame thus results in reduced performance and increased power consumption.

One solution to the problem of the display showing glitches is having the electronic device terminating the operation of the display during the switch. For example, an electronic device can require a complete system reboot when changing the selected processor for delivering graphics data. However, causing a system reboot interrupts any process being executed in the electronic device. In addition, once the system reboots, the electronic device requires the user manually select to the CPU or GPU as the source. Another solution has the electronic device switch processors without requiring a system reboot by having a main processor turn off the display. However, turning off the display is time consuming and interrupts the experience of the user while the display hardware is executing the switch.

As the foregoing illustrates, what is needed in the art are more effective ways to switch between visual data sources in an electronic device.

SUMMARY

Various embodiments disclose a system that includes a first source processor that generates a first stream of graphics data, a second source processor that generates a second stream of graphics data, a display device that displays at least one of the first stream of graphics data and the second stream of graphics data, and a timing controller that is coupled to the first source processor and the second source processor and receives a first control signal to enter into a self-refresh state, in response, enters into the self-refresh state, causes the display device to display a first frame stored in memory, wherein the first frame includes at least a portion of data included in the first stream of graphics data, receives a second stream of graphics data, exits the self-refresh state, and causes the display device to display the second stream of graphics data.

At least on advantage of the disclosed approach is that the computing system can switch the processor that acts as the source for graphics data without showing glitches, or requiring the display to be turned off. Because the disclosed approach does not turn off the display when switching the processor acting as the source, the disclosed approach saves time associated with turning the display back on, or rebooting the computing system.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
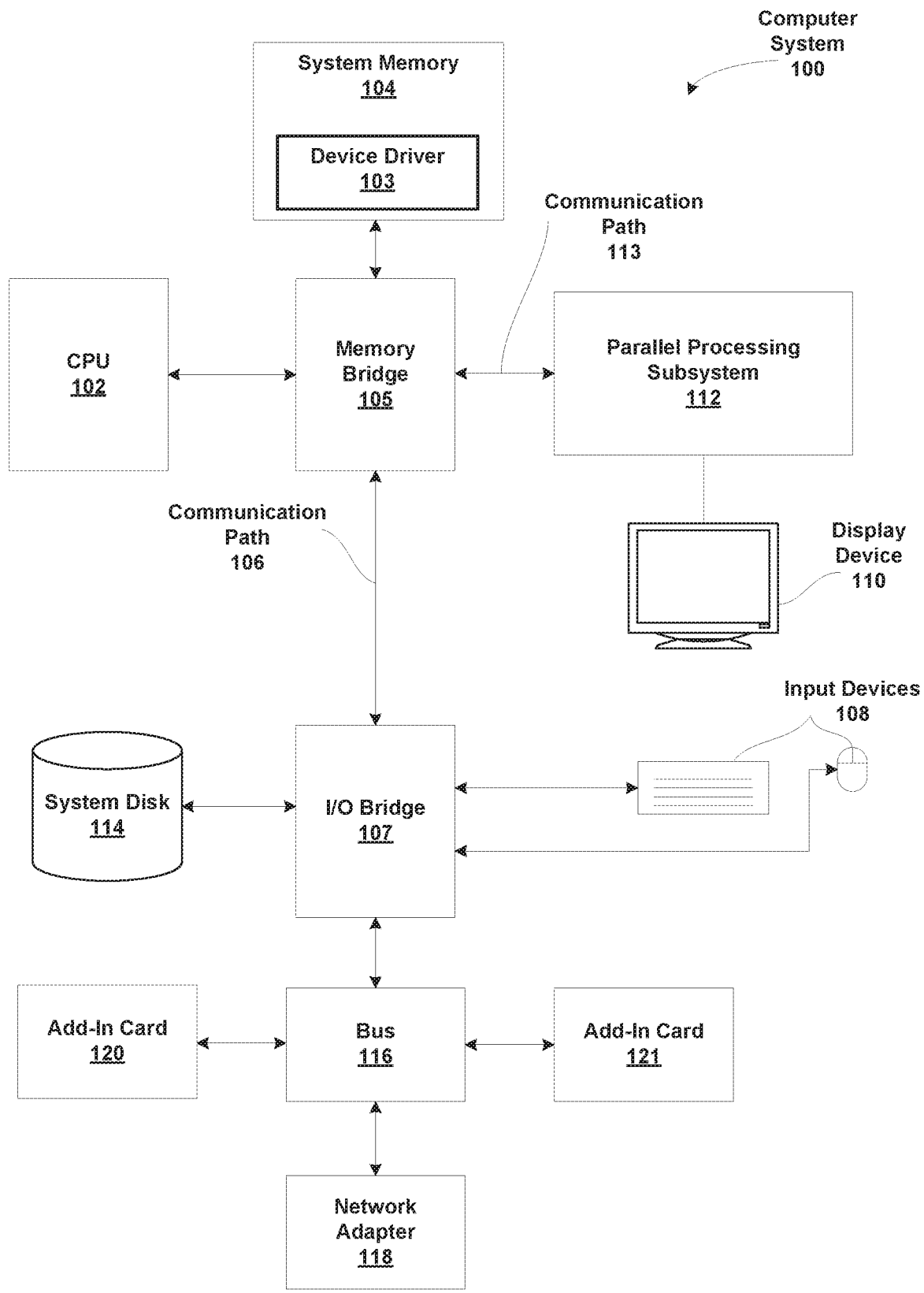
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a bus 116.

In operation, I/O bridge 107 is configured to receive user input information from input devices 108, such as a keyboard or a mouse, and forward the input information to CPU 102 for processing via communication path 106 and memory bridge 105. Bus 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes any number of software applications 125 that execute on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, bus 116 could be eliminated, and network adapter 118 and add-in cards 120, 121 would connect directly to I/O bridge 107.

Figure 2:
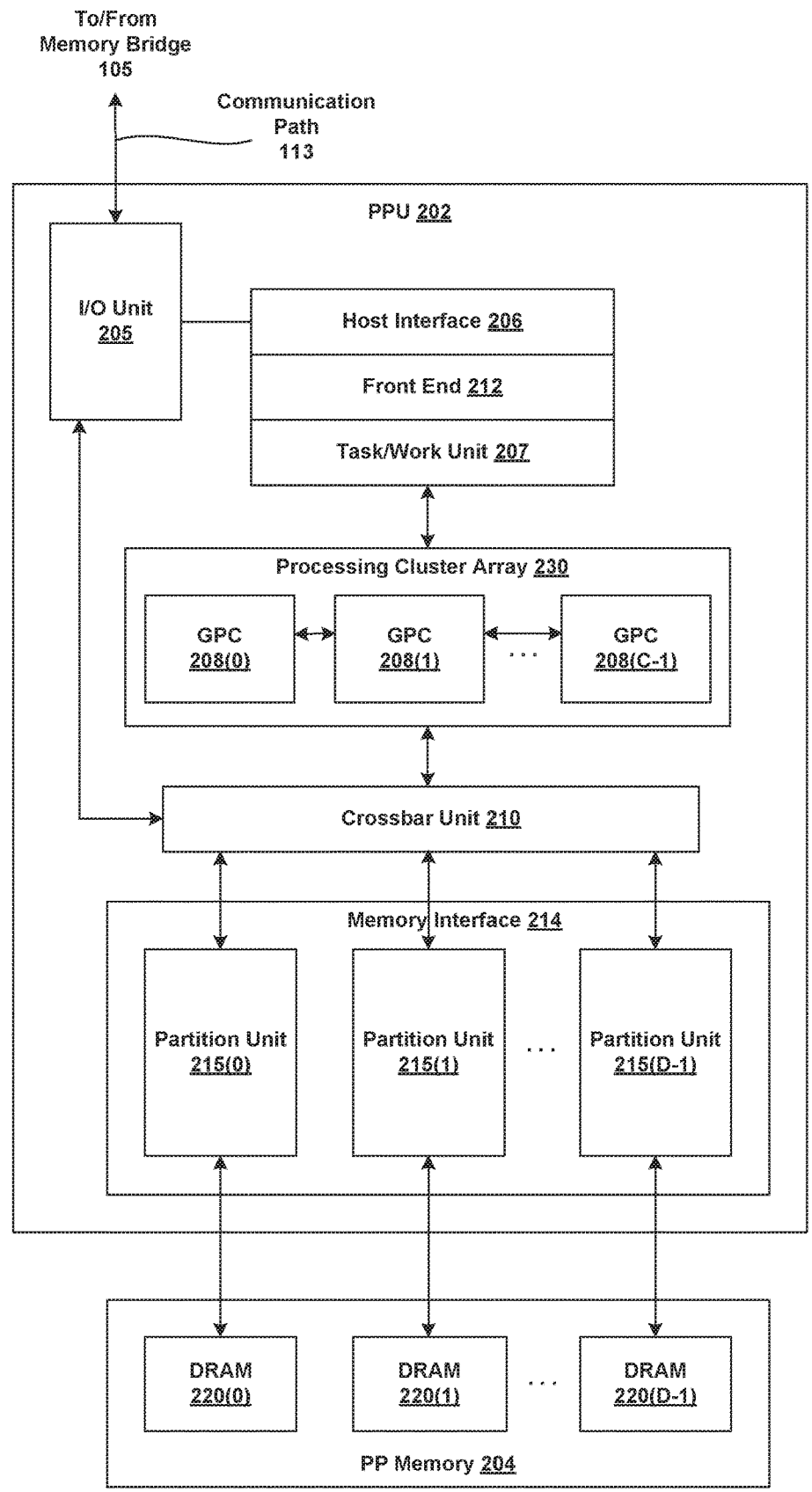
FIG. 2 illustrates a block diagram of a parallel processing subsystem included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
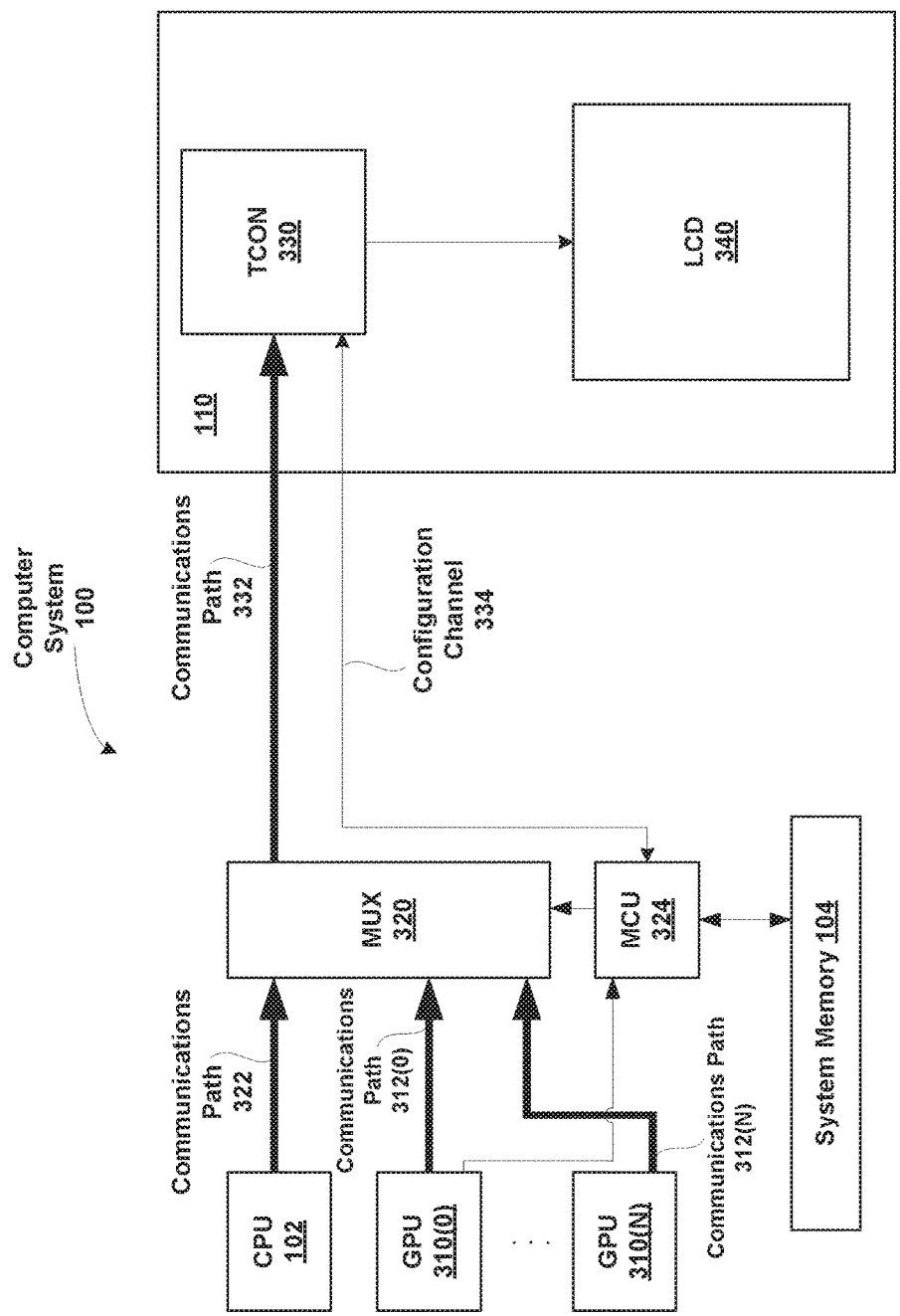
FIG. 3 is a more detailed illustration of the computer system of FIG. 1, according to various embodiments of the present invention.

FIG. 3 is a more detailed illustration of computer system 100 of FIG. 1, according to various embodiments of the present invention. As shown, computer system 100 includes CPU 102, GPUs 310(0)-310(N), multiplexer (MUX) 320, multiplexer control unit (MCU) 324, system memory 104, and display device 110. Display device 110 includes a timing controller (TCON) 330 and a liquid crystal display (LCD)

340. It will be appreciated that the system shown herein is illustrative and that multiple variations and modifications are within the scope of the present invention. For example, while CPU 102 and GPUs 310(0)-310(N) are shown, the present invention is applicable to any configuration of a system where multiple processors act as sources that provide graphics and/or video data.

During operation, MCU 324 sends multiple controls signals to MUX 320 and a TCON 330 to dynamically switch from a current processor acting as a source of graphics data to a newly-selected processor to serve as a source for graphics data. In some embodiments, MCU 324 causes a switch from a current processor CPU 102 to newly-selected processor GPU 310(N). In some embodiments, MCU 324 causes a switch from a current processor GPU 310(N) to newly-selected processor CPU 102. In other embodiments, MCU 324 causes a switch from a current processor GPU(0) to newly-selected processor GPU(N)

Display device 110 receives a stream of graphics data delivered from a selected processor from one of CPU 102 or GPUs 310(0)-310(N) through multiplexer (MUX) 320. During operation, MCU 324 controls MUX 320 to select a current processor to deliver graphics data to display device 110 via communications path 332. In various embodiments, the CPU 102 and/or one of more of the GPUs 310 can be other types of processing device, such as dedicated video processors or other application specific processors/integrated circuits. In various embodiments, one or more of the processors may generate any type of visual data, including, without limitation, any combination of video data, image data, or data captured by a camera or video recording device. In various embodiments, one or more of the processors may generate video files and/or video streams.

MCU 324 then causes timing controller (TCON) 330 within display device 110 to enter into a "self-refresh" state as MCU 324 controls MUX 320 to switch to a newly-selected processor to deliver graphics data to display device 110. When TCON 330 is in the self-refresh state, TCON 330 is configured to generate video signals from a static, cached frame of digital video independently from the graphics data received from MUX 320. Once the switch is complete, MCU 324 causes TCON 330 to exit from the self-refresh state and display the graphics data received from the newly-selected processor.

CPU 102 generates graphics data that is delivered via communications path 322 to display device 110 for display. In some embodiments, CPU 102 may include an integrated GPU (iGPU) that processes graphics primitives to produce frames of pixel data for display. In some embodiments, each of the one or more GPUs 310(0)-310(N) may be a dedicated GPU (dGPU) that generates graphics data that is delivered via a corresponding communications path 312(0)-312(N). One or more of GPUs 310(0)-310(N) produce frames of pixel data for display on display device 110. In some embodiments, CPU 102 and/or GPUs 310(0)-310(N) generates a digital video signal that includes the generated graphics data. CPU 102 and/or GPUs 310(0)-310(N) then streams the digital video signal to display device via a digital video interface in communications paths 312(0)-312(N), 322, 332. In some embodiments, CPU 102 and/or GPUs 310(0)-310(N) may generate and stream analog video signals via an analog video interface.

In some embodiments, a processor may control the operation of MUX 320 and/or TCON 330 by controlling MCU 324. For example, a main GPU 310(0) can send a command signal to MCU 324 to control one or more devices within computer system 100. In some embodiments, MCU 324 may be included within the main GPU 310(0). Main GPU 310(0) can send a switch command signal to MCU 324, and MCU 324 can send a selection signal to MUX 320 and a self-refresh state signal to TCON 330. MCU 324 transmits a selection signal MUX 320 in order for MUX 320 to select a specified input stream, received via communications paths 312(0)-312(N), 322, to output to display device 110 via communications path 332. Main GPU 310(0) sends a command signal to MCU 324 to generate a self-refresh state signal that is transmitted to TCON 330 over configuration channel 334. The self-refresh state signal causes TCON 330 to enter into a self-refresh state, or exit from the self-refresh state.

Multiplexer (MUX) 320 is a device that outputs a single signal selected from one of several input signals. In some embodiments, MUX 320 may receive multiple data streams via communications paths 312(0)-312(N), 322 as the input signals. MUX 320 selects one of the multiple communications paths 312(0)-312(N), 322 to output to display device 110 via communications path 332. In some embodiments, MUX 320 selects a communications path 312(0)-312(N), 322 as specified from a received control signal, such as a selection signal transmitted by MCU 324. In some embodiments, MUX 320 receives multiple selection signals from MCU 324. In such instances, MUX may switch the communications path 312(0)-312(N), 322 selected for output based on the most recent selection signal.

Multiplexer control unit (MCU) 324 is a device that manages the flow of graphics data to display device 110. In some embodiments, MCU 324 may be included within a processor, such as a main GPU 310(0). MCU 324 send control signals to various devices in computer system 100 to enable dynamic switching between processors CPU 102, GPUs 310(0)-310(N) that generate and transmit graphics data. In some embodiments, MCU 324 coordinates transmission of control signals to MUX 320 and TCON 330 to first cause TCON 330 to enter into a self-refresh state before MUX 320 switches the selected input signal from a first processor to a second processor. In some embodiments, MCU 324 may also cause a selected processor to begin streaming, and/or cause one or more non-selected processors to shutdown streaming.

For example, MCU 324 receives a switch command signal to switch the selected processor from CPU 102 to GPU 310(N). In response to the switch command signal, MCU 324 transmits a self-refresh state signal over configuration channel 334 to TCON 330 that causes TCON 330 to enter into a self-refresh state. While TCON 330 is in the self-refresh state, MCU 324 transmits a selection signal to MUX 320 that specifies GPU 310(N) as the selected processor. MUX 320 changes the selected input signal, originally the signal received from CPU 102 via communications path 322, to the signal received from GPU 310(N) over communications path 312(N). Once MUX 320 transmits graphics data from the newly-selected input signal, MCU 324 sends an additional self-refresh state signal to TCON 330 that causes TCON 330 to exit from the self-refresh state. Once TCON 330 exits the self-refresh state, display device 110 shows the graphics data generated from the selected processor of GPU 310(N).

In another example, MCU 324 generates control signals to MUX 320 and TCON 330 to switch from GPU 310(N) as the selected processor to CPU 102 as the newly-selected processor. In response to a switch command signal to switch from GPU 310(N) to CPU 102, MCU 324 transmits a self-refresh state signal over configuration channel 334 to TCON 330 that causes TCON 330 to enter into a self-refresh state. While TCON 330 is in the self-refresh state, MCU 324 transmits a selection signal to MUX 320 that specifies CPU 102 as the selected processor. MUX 320 changes the selected input signal, originally the signal received from GPU 310(N) via communications path 312(N), to the signal received from CPU 102 over communications path 322. Once MUX 320 transmits graphics data from the newly-selected input signal, MCU 324 sends an additional self-refresh state signal to TCON 330 that causes TCON 330 to exit from the self-refresh state. Once TCON 330 exits the self-refresh state, display device 110 shows the graphics data generated from the selected processor of GPU 310(N).

In various embodiments, MCU 324 may interface with one or more arbitrators that configure TCON 330 to drive display device 110. The arbitrator may be hardware and/or software that interfaces with MCU 324 in order to drive the output displayed by display device 110. For example, MCU 324 could interface with arbitrator software, such as operating system (OS) software that is independent of MCU 324 and/or TCON 330, in order to pre-configure TCON 330 for the applicable source processor CPU 102, GPU 310(0)-310 (N).

Each of communications paths 312(0)-312(N), 322, 332 includes one or more links that transmits data. Communications paths 312(0)-312(N), 332, 332 incorporate one or more video interfaces, such as a DisplayPort (DP) interface to transmit display data between devices. In some embodiments, communications path 312(0)-312(N), 322, 332 may comprise a digital video interface that includes a main link having one or more lanes to transmit graphics data, and an auxiliary (AUX) channel having at least one lane to transmit graphics data and/or other data. In some embodiments, two or more communications paths 312(0)-312(N), 322 may transmit data to MUX 320 simultaneously. In such instances, MUX 320 may select a specified input signal to transmit as an output via communications path 332.

Configuration channel 334 is a link between MCU 324 and display device 110 that transmits control signals between MCU 324 and TCON 330. In some embodiments, the MCU 324 may control TCON 330 by sending one or more control signals, such as self-refresh state signals, to TCON 330 via configuration channel 334. Data, including the one or more control signals, sent via configuration channel 334 may be sent using one or more communication protocols, such as inter-integrated circuit (I²C), serial peripheral interface (SPI), general-purpose input/output (GPIO), or a similar communications interface. In some embodiments, configuration channel 334 is separate from communications path 332 and data sent through configuration channel 334 may be transmitted independent of the graphics data sent through communications path 332.

As shown, display device 110 includes timing controller (TCON) 330 and liquid crystal display (LCD) device 340. During operation, display device 110 receives video signals and drives LCD 340 to show images based on the received video signals. In some embodiments, display device 110 may include an analog-to-digital (A/D) processor to convert received analog video signals into digital video signals. In some embodiments, display device 110 may store graphics data included in the received video signal as one or more frames of pixel data in memory. In some embodiments, the memory may be system memory 104 or memory internal to TCON 330 (not shown). During operation, display device 110 is configured to drive LCD 340 to display the received video signals. In some embodiments, the video signal may be provided from communications path 332. Alternatively, when TCON 330 is operating in the self-refresh state, the video signal may be provided from TCON 330, where the video signal includes data for the one or more frames of pixel data stored in memory.

Timing controller (TCON) 330 is a device included within display device 110 that drives LCD 340 to display the received video signals. TCON 330 receives graphics data included video signals via communications path 332. In various embodiments, TCON 330 may be included in one of CPU 102 and/or GPU 310(0)-310(N). In some embodiments, TCON 330 may send video timing signals to one or more graphics drivers (not shown) included in display device 110 to drive LCD 340 to display the received video signals. In some embodiments, TCON 330 may include an internal memory and TCON 330 may store one or more frames of pixel data included in the video signal received via communications path 332.

In some embodiments, TCON 330 may transition into a self-refresh state and may exit from the self-refresh state. When operating in the self-refresh state, TCON 330 freezes the image display device 110 shows by driving LCD 340 to continuously display one frame of pixel data. In some embodiments, the one frame TCON 330 drives LCD 340 to show is the last frame of pixel data received in a video signal via communications path 332 before entering into the self-refresh state. In such instances, TCON 330 cached the last frame into an internal memory. While TCON 330 is in the self-refresh state, MCU 324 switches the selected processor that delivers graphics data to display device 110. Because the TCON 330 drives LCD 340 to display the frame stored in internal memory instead of frames received from MUX 320, MUX 320 can switch the selected processor without affecting the output of LCD 340 during the switch.

In some embodiments, while in the self-refresh state, TCON 330 may synchronize with the selected processor that is delivering the graphics data. In some embodiments, TCON 330 may perform link-training with the selected processor over the one or more communications paths 312(0)-312(N), 322, 332. For example, when switching from CPU 102 to GPU 310(N), TCON 330 can perform link-training over communications paths 312(N), 332 after MUX 320 changed the selected input to communications path 312(N). When performing link-training between TCON 330 and the selected processor GPU 310(N), the two devices send signaling communications to tune equalization settings. Such communications tunes the stream of graphics data through communications path 332, MUX 320, and communications path 312(N). Upon completion of link-training, TCON 330 exits out of the self-refresh state. In some embodiments, TCON 330 may receive a self-refresh state signal from MCU 324 to exit out from the self-refresh state. When TCON 330 is exits from the self-refresh state, TCON 330 may cause LCD 340 to display frames of pixel data included in the video signal through communications path 332.

In some embodiments, LCD 340 may comprise a single display or multiple displays. Further, it is noted that LCD 340 is illustrative only and that other types of displays fall within the scope of the present invention. In that regard, persons skilled in the art will understand that the present invention is applicable to any type of display, including and without limitation, an organic light emitting diode (OLED) display, an active-matrix organic light-emitting diode display (AMOLED), a QOLED, a QLED, an electrophoretic display ("ePaper"), an electro-wetting display, and the like.

Figure 4:
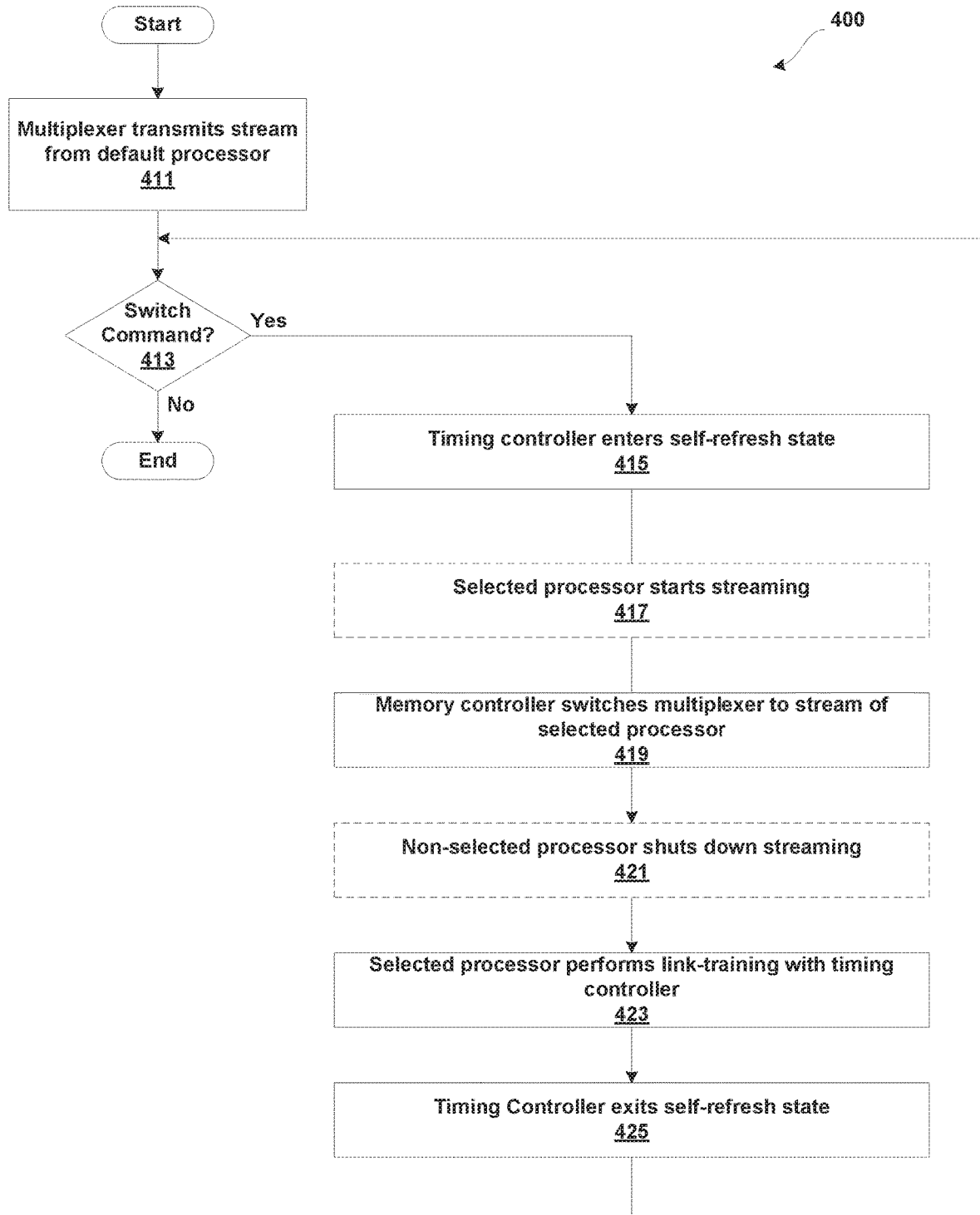
FIG. 4 sets forth a flow diagram of method steps for dynamically switching streams that are input to a display device, according to various embodiments of the present invention.

FIG. 4 sets forth a flow diagram of method steps for dynamically switching streams that are input to a display device, according to various embodiments of the present invention. Although the method steps are described in conjunction with the systems of FIGS. 1-3, persons skilled in the art will understand that any system configured to implement the method steps, in any order, falls within the scope of the present invention.

As shown, a method 400 is implemented by computer system 100 to dynamically switch from a current processor to a newly-selected processor. In some embodiments, computer system 100 implements method 400 to switch from a current processor CPU 102 to newly-selected processor GPU 310(N). In some embodiments, computer system 100 implements method 400 to switch from a current processor GPU 310(N) to newly-selected processor CPU 102. In other embodiments, computer system 100 implements method 400 to switch from a current processor GPU(0) to newly-selected processor GPU(N)

The method 400 beings at step 411, where MUX 320 transmits a current stream that is generated by a current processor. In some embodiments, an integrated GPU (iGPU) included in CPU 102 may be a default processor that is the current processor selected to be streaming to display device 110. In such instances, MUX 320 outputs the video signal from the selected input of communications path 322. In other embodiments, a dedicated GPU (dGPU), such as one of GPUs 310(0)-310(N), may be the current processor. When one of GPUs 310(0)-310(N) is the selected input for MUX 320, MUX outputs the video signal from the corresponding communications path 312(0)-312(N). For example, when GPU 310(0) is the current processor, MUX 320 outputs the video signal received from selected communications path 312(0). TCON 330 within display device 110 receives the stream from MUX 320 through communications path 332. The stream includes the video signal generated by the current processor. TCON 330 drives LCD 340 to display the video signal included in the current stream. In some embodiments, TCON 330 may cache one or more frames of pixel data received in the stream over communications path 322.

At step 413, MCU 324 determines whether a switch command signal to switch the selected source for graphics data was received. MCU 324 receives a command signal from a processor, such as a main GPU 310(0), to switch the source that is selected by MUX 320, where MUX 320 outputs the stream from the selected communications path 312(0)-312(N), 322. When MCU 324 determines that a switch command signal was not received, method 400 ends. Otherwise, when MCU 324 determines that a switch command signal was received, MCU 324 proceeds to step 415.

At step 415, TCON 330 enters a self-refresh state. In some embodiments, TCON 330 receives a self-refresh state signal from MCU 324 via configuration channel 334 to enter the self-refresh state. In some embodiments, MCU 324 generates the self-refresh state signal in response to determining that the switch command signal was received in step 413. In some embodiments, TCON 330 receives the self-refresh state signal via configuration channel 334, where TCON 330 receives the self-refresh state signal independent from any data received through communications path 332. When TCON 330 enters the self-refresh state, TCON 330 TCON 330 drives LCD 340 to continuously display the last frame of pixel data that was previously cached. In some embodiments, the last frame is cached within the internal memory of TCON 330. In some embodiments, the last frame is cached in system memory 104. In some embodiments, TCON 330 may driver LCD 340 to continuously display the last frame of pixel data until TCON 330 exits from the self-refresh state.

At step 417, the processor newly-selected to be the source for the graphics data may optionally start streaming. In some embodiments, a processor that is not the current source for the graphics data sent to display device 110 may not generate graphics data for streaming until being selected for streaming. For example, when CPU 102 is the current processor, a non-selected processor GPU 310(N) may not stream until being selected. In such instances, MCU 324 may cause the newly-selected processor GPU 310(N) to start streaming by sending a control signal to GPU 310(N). Upon receiving the control signal, GPU 310(N) begins generating graphics data and transmitting the graphics data via communications path 312(N) to MUX 320.

At step 419, MCU 324 causes MUX 320 to switch the selected input stream from the input corresponding to the current processor, to the input corresponding to the newly-selected processor. MCU 324 sends a selection signal to MUX 320 that specifies a new input signal to select for output through communications path 332. For example, when switching from a current stream received from CPU 102 over communications path 322 to a newly-selected stream received from GPU 310(N) through communications path 312(N), MCU 324 may send a selection signal specifying communications path 312(N) as the new input path being selected. The selection signal causes MUX 320 to switch the selected input path that is output via communications path 332. Instead of transmitting the stream received from CPU 102 through communications path 322, MUX 320 instead transmits the stream received from GPU 310(N) through communications path 312(N).

At step 421, MCU 324 may optionally shut down the processor no longer selected for streaming. In some embodiments, one or more non-selected processors may shut down and stop generating graphics data when MUX 320 does not select the processor for streaming. In such instances, MCU 324 causes the one or more non-selected processors to shut down streaming. For example, MUX 320 can switch the selected stream from GPU 310(N) via communications path 312(N) to GPU 310(0) via communications path 312(0). After switching to the newly-selected processor GPU 310(0) through communications path 312(0), MCU 324 can cause the non-selected processor GPU 310(N) to shutdown streaming. In some embodiments, MCU 324 can cause additional non-selected processors GPU 310(0)-310(N-1) to shutdown streaming as well. In some embodiments, GPU 310(N) may stop generating graphics data until MCU 324 causes GPU 310(N) to start streaming. In other embodiments, one or more of the non-selected processors GPU 310(0)-310(N) may continue generating graphics data and streaming graphics data to MUX 320.

At step 423, the newly-selected processor performs link-training with TCON 330. TCON 330 is in the self-refresh state when the newly-selected processor streams graphics data via MUX 320 and communications path 332. While in the self-refresh state, TCON 330 begins receiving data from the newly-selected stream. In some embodiments, TCON 330 may perform link-training with the newly-selected processor in order to tune the stream of graphics data between the two devices. For example, when CPU 102 is the current processor and GPU 310(N) is the newly-selected processor, TCON 330 can perform link-training with GPU 310(N) after MUX 320 switches the selected input path to communications path 312(N). The link-training tunes the stream through the data path of communications path 312(N), MUX 320, and communications path 332.

At step 425, TCON 330 exits from the self-refresh state. In some embodiments, TCON 330 receives a self-refresh state signal via configuration channel 334 to exit the self-refresh state. In some embodiments, TCON 330 receives the self-refresh state signal from MCU 324 via configuration channel 334, where TCON 330 receives the self-refresh state signal independent from any data received through communications path 332. Receiving the self-refresh state signal via configuration channel 334 causes TCON 330 to exit from the self-refresh state. When TCON 330 exits from the self-refresh state, TCON 330 stops driving LCD 340 to continuously show the cached last frame stored in memory. Upon exiting the self-refresh state, TCON 330 drives LCD 340 to display frames of pixel data included in the stream received from the newly-selected processor. For example, when switching from a current processor CPU 102 to a newly-selected processor GPU 310(N) as the selected source to generate graphics data. TCON 330 may driver LCD 340 to continuously show the last frame of pixel data received from CPU 102 before entering the self-refresh state. After MUX 320 switches to GPU 310(N) and after TCON 330 exits the self-refresh state, TCON 330 drives LCD 340 to display frames of pixel data included in the stream generated by GPU 310(N).

In sum, embodiments of the present disclosure are directed towards a timing controller in a computer system that enables a display device to dynamically switch between input streams of graphics data. A currently-selected processor acts as a source for a stream of graphics data that is delivered to a display device through a communications path. When switching the processor that acts as the source, a multiplexer control unit sends a control signal over a configuration channel separate from the communications path that delivers the graphics data. The control signal causes a timing controller in the display device to enter into a self-refresh state, which causes the display device to continuously show a cached frame of pixel data received from the currently-selected processor. While the timing controller is in the self-refresh state, a newly-selected processor generates graphics data and transmits the graphics data over a different stream.

The multiplexer control unit causes a multiplexer that receives the multiple streams from the currently-selected processor and the newly-selected processor to switch the selected input. Upon switching the selected input, the multiplexer outputs the stream generated by the newly-selected processor, where the multiplexer delivers the stream through the communications path to the display device. The timing controller and the newly-selected processor perform link-training to tune the selected stream as graphics data traverses from the newly-selected processor to the timing controller. Once the link-training is complete, the multiplexer control unit sends a separate control signal over the configuration channel, which causes the timing controller to exit from the self-refresh state. Upon exiting the self-refresh state, the display device shows the stream of graphics data generated by the newly-selected processor.

At least one advantage of the disclosed approach is that the computing system can switch the processor that acts as the source for graphics data without showing glitches, or requiring the display to be turned off. Because the disclosed approach does not turn off the display when switching the processor acting as the source, the disclosed approach saves time associated with turning the display back on, or rebooting the computing system. Further, the disclosed approach enables the timing controller to enter into the self-refresh state and exit from the self-refresh state based on control signals received over a configuration channel separate from the communications path that delivers graphics data. In particular, the disclosed approach enables the timing controller to enter into the self-refresh state independent of the chosen stream selected by the multiplexer, which enables the display device to switch the processor acting as the source without requiring the display to be shut off.

1. In some embodiments, a system comprises a first source processor that generates a first stream of graphics data, a second source processor that generates a second stream of graphics data, a display device that displays at least one of the first stream of graphics data and the second stream of graphics data, and a timing controller that is coupled to the first source processor and the second source processor and receives a first control signal to enter into a self-refresh state, in response, enters into the self-refresh state, causes the display device to display a first frame stored in memory, where the first frame includes at least a portion of data included in the first stream of graphics data, receives a second stream of graphics data, exits the self-refresh state, and causes the display device to display the second stream of graphics data.

2. The system of clause 1, further comprising a multiplexer control unit that generates the first control signal.

3. The system of clause 1 or 2, where the multiplexer control unit causes the first source processor to cease generating the first stream of graphics data.

4. The system of any of clauses 1-3, where the multiplexer control unit causes the second source processor to generate the second stream of graphics data.

5. The system of any of clauses 1-4, where the multiplexer control unit generates the first control signal in response to receiving a switch command signal from at least one of the first source processor and the second source processor.

6. The system of any of clauses 1-5, further comprising a multiplexer that receives the first stream of graphics data from the first source processor, receives the second stream of graphics data from the second source processor, receives the first control signal, and in response to the first control signal, transmits the second stream of graphics data to the timing controller.

7. The system of any of clauses 1-6, where the timing controller is included in the first source processor.

8. The system of any of clauses 1-7, where the timing controller is included in the display device.

9. The system of any of clauses 1-8, where the first frame is stored in an internal memory included in the timing controller.

10. The system of any of clauses 1-9, where the first source processor comprises a central processing unit (CPU), and the second source processor comprises a graphics processing unit (GPU).

11. The system of any of clauses 1-10, where the first source processor comprises a GPU, and the second source processor comprises a CPU.

12. The system of any of clauses 1-11, where the first source processor comprises a first GPU, and the second source processor comprises a second GPU.

13. The system of any of clauses 1-12, further comprising one or more communications paths that transmit at least one of the first stream of graphics data and the second stream of graphics data, and a separate configuration channel that transmits the first control signal.

14. In some embodiments, a computer-implemented method comprises receiving a first control signal to enter into a self-refresh state, in response to receiving the first control signal, entering into the self-refresh state and causing a display device to display a first frame stored in memory, where the first frame includes at least a portion of data included in a first stream of graphics data generated by a first source processor, receiving a second stream of graphics data generated by a second source processor, and exiting the self-refresh state and causing the display device to display the second stream of graphics data.

15. The computer-implemented method of clause 14, further comprising receiving the at least a portion of data included in the first stream of graphics data before entering into the self-refresh state.

16. The computer-implemented method of clause 14 or 15, further comprising link-training with the second source processor after entering the self-refresh state.

17. The computer-implemented method of any of clauses 14-16, further comprising receiving a second control signal to exit the self-refresh state after link-training with the second source processor has completed.

18. The computer-implemented method of any of clauses 14-17, where the first stream of graphics data and the second stream of graphics data are received via at least one communications path.

19. The computer-implemented method of any of clauses 14-18, where the first control signal is received via a configuration channel that is separate from the at least one communications path.

20. One or more non-transitory computer-readable media including instructions that, when executed by one or more processors, cause the one or more processors to perform the steps of receiving a first control signal to enter into a self-refresh state, entering into the self-refresh state, causing a display device to display a first frame that is stored in memory, receiving a second stream of graphics data generated by a second source processor, exiting the self-refresh state, and causing the display device to display the second stream of graphics data.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system comprising:
   a first source processor that is external to a display device and generates a first stream of graphics data;
   a second source processor that also is external to the display device and generates a second stream of graphics data;
   the display device that receives the first stream of graphics data from the first source processor and the second stream of graphics data from the second source processor and displays at least one of the first stream of graphics data and the second stream of graphics data, and
a timing controller that is included within the display device and coupled to the first source processor and the second source processor and, wherein, during operation, the timing controller:
receives a first control signal to enter into a self-refresh state;
in response, enters into the self-refresh state;
causes the display device to display a first frame stored in memory, wherein the first frame includes at least a portion of data included in the first stream of graphics data;
receives the second stream of graphics data;
exits the self-refresh state; and
in response to exiting the self-refresh state, causes the display device to display the second stream of graphics data from the second source processor.

2. The system of claim 1, further comprising a multiplexer control unit that generates the first control signal.

3. The system of claim 2, wherein the multiplexer control unit causes the first source processor to cease generating the first stream of graphics data.

4. The system of claim 2, wherein the multiplexer control unit causes the second source processor to generate the second stream of graphics data.

5. The system of claim 2, wherein the multiplexer control unit generates the first control signal in response to receiving a switch command signal from at least one of the first source processor and the second source processor.

6. The system of claim 1, further comprising a multiplexer that:
receives the first stream of graphics data from the first source processor;
receives the second stream of graphics data from the second source processor;
receives the first control signal; and
in response to the first control signal, transmits the second stream of graphics data to the timing controller.

7. The system of claim 1, wherein the first frame is stored in an internal memory included in the timing controller.

8. The system of claim 1, wherein the first source processor comprises a central processing unit (CPU), and the second source processor comprises a graphics processing unit (GPU).

9. The system of claim 1, wherein the first source processor comprises a graphics processing unit (GPU), and the second source processor comprises a central processing unit (CPU).

10. The system of claim 1, wherein the first source processor comprises a first graphics processing unit (GPU), and the second source processor comprises a second GPU.

11. The system of claim 1, further comprising:
one or more communications paths that transmit at least one of the first stream of graphics data and the second stream of graphics data; and
a separate configuration channel that transmits the first control signal.

12. A computer-implemented method comprising:
receiving, at a timing controller included within a display device, a first control signal to enter into a self-refresh state;
in response to receiving the first control signal, entering into the self-refresh state within the display device and causing the display device to display a first frame stored in memory, wherein the first frame includes at least a portion of data included in a first stream of graphics data generated by a first source processor that is external to the display device;
receiving a second stream of graphics data generated by a second source processor that is external to the display device;
exiting the self-refresh state; and
in response to exiting the self-refresh state, causing the display device to display the second stream of graphics data from the second source processor.

13. The computer-implemented method of claim 12, further comprising receiving the at least a portion of data included in the first stream of graphics data before entering into the self-refresh state.

14. The computer-implemented method of claim 12, further comprising link-training with the second source processor after entering the self-refresh state.

15. The computer-implemented method of claim 14, further comprising receiving a second control signal to exit the self-refresh state after link-training with the second source processor has completed.

16. The computer-implemented method of claim 12, wherein the first stream of graphics data and the second stream of graphics data are received via at least one communications path.

17. The computer-implemented method of claim 16, wherein the first control signal is received via a configuration channel that is separate from the at least one communications path.

18. One or more non-transitory computer-readable media including instructions that, when executed by one or more processors, cause the one or more processors to perform the steps of:
receiving, at a timing controller included within a display device, a first control signal to enter into a self-refresh state;
entering into the self-refresh state within the display device;
causing the display device to display a first frame that is stored in memory, wherein the first frame includes at least a portion of data included in a first stream of graphics data generated by a first source processor that is external to the display device;
receiving a second stream of graphics data generated by a second source processor that is external to the display device;
exiting the self-refresh state; and
in response to exiting the self-refresh state, causing the display device to display the second stream of graphics data from the second source processor.

* * * * *